US011217103B2

(12) United States Patent
Hladik et al.

(10) Patent No.: US 11,217,103 B2
(45) Date of Patent: Jan. 4, 2022

(54) METHOD AND SYSTEM FOR LOCALIZING A MOVABLE OBJECT

(71) Applicant: Siemens Mobility GmbH, Munich (DE)

(72) Inventors: Reinhard Hladik, Vienna (AT); Martin Schiefer, St. Pölten (AT); Guido Schröer, Munich (DE)

(73) Assignee: SIEMENS MOBILITY GMBH, Munich (DE)

( * ) Notice: Subject to any disclaimer, the term of this patent is extended or adjusted under 35 U.S.C. 154(b) by 0 days.

(21) Appl. No.: 16/845,173

(22) Filed: Apr. 10, 2020

(65) Prior Publication Data

US 2020/0334988 A1 Oct. 22, 2020

(30) Foreign Application Priority Data

Apr. 19, 2019 (EP) .................................. 19170367

(51) Int. Cl.
*G08G 1/00* (2006.01)
*G08G 1/01* (2006.01)
(Continued)

(52) U.S. Cl.
CPC .......... *G08G 1/205* (2013.01); *G08G 1/0116* (2013.01); *G08G 1/127* (2013.01); *H04W 4/023* (2013.01); *H04W 4/025* (2013.01)

(58) Field of Classification Search
CPC ...... G08G 1/205; G08G 1/0116; G08G 1/127; H04W 4/025
See application file for complete search history.

(56) References Cited

U.S. PATENT DOCUMENTS 3,568,161 A * 3/1971 Knickel .................. G08G 1/20
340/992
3,697,941 A * 10/1972 Christ ..................... G08G 1/20
340/991
(Continued)

FOREIGN PATENT DOCUMENTS

AU 2020202547 11/2020
EP 1666912 6/2006
(Continued)

OTHER PUBLICATIONS

Office Action dated Oct. 16, 2020 issued Australian Patent Application No. 2020202547.
(Continued)

*Primary Examiner* — Curtis J King
(74) *Attorney, Agent, or Firm* — Cozen O'Connor

(57) ABSTRACT

A system and method for localizing a movable object that includes a first transmitter and a second transmitter which are arranged at a geometric distance relative to one another, wherein the first transmitter and the second transmitter each transmit a first signal and a second signal, wherein the first and second signal are in temporal synchrony relative to one another and furthermore a receiver is provided, which receives the first signal via receiving device and determines a first direction, from which the first signal is received, and receives the second signal and determines a second direction, from which the second signal is received, and a runtime difference between the first signal and the second signal, and where the position of the movable object is determined from the runtime difference, the distance, the first direction and the second direction by an evaluator.

16 Claims, 3 Drawing Sheets

(51) Int. Cl.
*G08G 1/127* (2006.01)
*H04W 4/02* (2018.01)

(56) References Cited

U.S. PATENT DOCUMENTS

| | | | | |
|---|---|---|---|---|
| 3,940,630 | A * | 2/1976 | Bergonz | G01S 1/02 340/991 |
| 4,099,591 | A * | 7/1978 | Carr | G08G 1/123 180/168 |
| 4,296,400 | A * | 10/1981 | Becker Friedbert | G08G 1/087 340/906 |
| 4,791,571 | A * | 12/1988 | Takahashi | G08G 1/127 340/910 |
| 4,799,162 | A * | 1/1989 | Shinkawa | G08G 1/123 340/910 |
| 4,908,629 | A * | 3/1990 | Apsell | G01S 5/02 340/426.15 |
| 5,936,527 | A * | 8/1999 | Isaacman | A01K 11/006 340/572.1 |
| 6,037,881 | A * | 3/2000 | Bornhauser | G01C 21/26 340/906 |
| 6,169,497 | B1 * | 1/2001 | Robert | G08G 1/127 340/988 |
| 6,181,253 | B1 * | 1/2001 | Eschenbach | G08B 21/0261 340/10.1 |
| 6,239,721 | B1 * | 5/2001 | Smith | G01S 19/11 340/8.1 |
| 6,243,588 | B1 * | 6/2001 | Koorapaty | G01S 5/14 455/456.2 |
| 6,329,908 | B1 * | 12/2001 | Frecska | G08B 3/1083 340/384.7 |
| 6,374,176 | B1 * | 4/2002 | Schmier | G08G 1/123 340/988 |
| 6,493,649 | B1 * | 12/2002 | Jones | G01S 5/186 367/99 |
| 6,556,899 | B1 * | 4/2003 | Harvey | G08G 1/123 340/989 |
| 6,654,682 | B2 * | 11/2003 | Kane | G08G 1/123 340/988 |
| 6,681,174 | B1 * | 1/2004 | Harvey | G08G 1/127 340/433 |
| 6,728,545 | B1 * | 4/2004 | Belcea | G01S 5/0284 342/357.64 |
| 8,111,141 | B1 * | 2/2012 | Brand | H04B 5/0056 340/10.5 |
| 8,965,411 | B1 * | 2/2015 | Busch-Sorensen | G01S 1/08 455/456.3 |
| 2002/0053985 | A1 * | 5/2002 | Nesbitt | H04J 3/0682 340/994 |
| 2003/0117320 | A1 * | 6/2003 | Kim | G01S 11/02 342/457 |
| 2003/0193388 | A1 * | 10/2003 | Ghabra | G07C 9/00309 340/5.61 |
| 2005/0280574 | A1 * | 12/2005 | Tafas | B01L 3/545 342/126 |
| 2006/0128354 | A1 * | 6/2006 | Carle | G08B 21/0272 455/404.1 |
| 2006/0230104 | A1 * | 10/2006 | Winter | H04L 69/14 709/203 |
| 2007/0014189 | A1 * | 1/2007 | Basilico | G01S 3/8083 367/128 |
| 2007/0052534 | A1 * | 3/2007 | Bird | G01S 5/0284 340/539.13 |
| 2007/0290846 | A1 * | 12/2007 | Schilling | G06K 7/10128 340/572.1 |
| 2008/0113787 | A1 * | 5/2008 | Alderucci | G07F 17/3206 463/29 |
| 2008/0239478 | A1 * | 10/2008 | Tafas | G02B 21/34 359/396 |
| 2008/0259310 | A1 * | 10/2008 | Wada | G01C 3/06 356/3.11 |
| 2008/0268873 | A1 * | 10/2008 | Wymeersch | G01S 5/0289 455/456.6 |
| 2009/0174546 | A1 * | 7/2009 | Lian | G01S 5/14 340/539.1 |
| 2010/0030916 | A1 * | 2/2010 | Greenwood Graham | H04W 56/006 709/248 |
| 2010/0094532 | A1 * | 4/2010 | Vorona | G08G 1/096775 701/119 |
| 2010/0167687 | A1 * | 7/2010 | Morrey | H04N 7/18 455/404.1 |
| 2010/0295681 | A1 * | 11/2010 | Burns | G01S 11/06 340/572.1 |
| 2011/0038230 | A1 * | 2/2011 | Napolitano | G01S 5/26 367/127 |
| 2011/0156870 | A1 * | 6/2011 | Attew | G01S 5/14 340/10.1 |
| 2011/0304441 | A1 * | 12/2011 | Roesner | G07B 15/063 340/10.4 |
| 2012/0050016 | A1 * | 3/2012 | Bieber | G01S 13/878 340/10.1 |
| 2012/0083995 | A1 * | 4/2012 | Vorona | G08G 1/096775 701/119 |
| 2012/0286972 | A1 * | 11/2012 | Bouzaglo | G06Q 20/14 340/932.2 |
| 2013/0005349 | A1 * | 1/2013 | Sanders | G01S 5/12 455/456.1 |
| 2013/0197803 | A1 * | 8/2013 | Park | B60L 53/35 701/537 |
| 2013/0222185 | A1 | 8/2013 | Hamida et al. | |
| 2014/0035732 | A1 * | 2/2014 | Karr | G01S 13/825 340/10.5 |
| 2014/0320643 | A1 * | 10/2014 | Markendorf | G01B 11/14 348/140 |
| 2014/0335897 | A1 * | 11/2014 | Clem | G08G 1/147 455/456.3 |
| 2015/0009493 | A1 * | 1/2015 | Kwiatkowski | G01S 17/42 356/139.06 |
| 2015/0043007 | A1 * | 2/2015 | Kwiatkowski | G01B 9/02 356/498 |
| 2015/0126216 | A1 * | 5/2015 | Mullins | G01S 13/765 455/456.1 |
| 2015/0199890 | A1 * | 7/2015 | Hewett | G08B 13/2428 340/572.1 |
| 2015/0223013 | A1 * | 8/2015 | Park | H04W 4/80 455/41.2 |
| 2015/0226841 | A1 * | 8/2015 | Luthi | G01S 7/497 356/5.01 |
| 2015/0268034 | A1 * | 9/2015 | Blohm | G01B 11/14 356/498 |
| 2016/0037300 | A1 * | 2/2016 | Vitek | H04B 17/318 455/456.3 |
| 2016/0055692 | A1 * | 2/2016 | Trani | G07C 9/20 340/5.61 |
| 2016/0234709 | A1 * | 8/2016 | Fischer | C12Q 1/6883 |
| 2017/0006429 | A1 * | 1/2017 | Douglas | H04W 4/027 |
| 2017/0006449 | A1 * | 1/2017 | Igumnov | H04W 4/024 |
| 2017/0082729 | A1 * | 3/2017 | Bar-Shalom | G01S 5/10 |
| 2017/0131397 | A1 * | 5/2017 | Schoor | G01S 13/584 |
| 2017/0168158 | A1 * | 6/2017 | Reining | H04M 1/72519 |
| 2017/0242093 | A1 * | 8/2017 | Lindgren | G01S 5/0221 |
| 2017/0337370 | A1 * | 11/2017 | Chereshnev | H04B 1/3833 |
| 2017/0347367 | A1 * | 11/2017 | Tandai | G08G 1/052 |
| 2018/0045807 | A1 | 2/2018 | Senna et al. | |
| 2018/0082493 | A1 * | 3/2018 | Patil | H04Q 9/00 |
| 2018/0115858 | A1 * | 4/2018 | Raghavendra | H04W 48/16 |
| 2018/0276987 | A1 * | 9/2018 | Lucken | G01S 7/52004 |
| 2018/0313937 | A1 * | 11/2018 | Dai | G01S 1/70 |
| 2019/0075423 | A1 * | 3/2019 | Hrabak | H04W 4/023 |
| 2019/0156266 | A1 * | 5/2019 | Hubbard | G06Q 10/06398 |
| 2019/0179014 | A1 * | 6/2019 | Waslowski | G01S 17/48 |
| 2019/0277641 | A1 * | 9/2019 | Haug | G01C 21/206 |
| 2019/0346531 | A1 * | 11/2019 | Apostolos | B60R 25/30 |
| 2020/0017073 | A1 * | 1/2020 | Suzuki | H04W 4/025 |
| 2020/0200881 | A1 * | 6/2020 | Maier | G01S 17/08 |
| 2020/0210461 | A1 * | 7/2020 | Zhang | G08G 1/0116 |
| 2020/0242922 | A1 * | 7/2020 | Dulberg | G08G 1/0116 |
| 2020/0286310 | A1 * | 9/2020 | Carver | G06Q 40/08 |
| 2020/0334988 | A1 | 10/2020 | Hladik et al. | |

(56) References Cited

U.S. PATENT DOCUMENTS

FOREIGN PATENT DOCUMENTS

| EP | 2616833 | 7/2013 |
| EP | 3726241 | 10/2020 |
| WO | 03028278 | 4/2003 |
| WO | 2007013069 | 2/2007 |
| WO | 2017108947 | 6/2017 |
| WO | WO 2018/031972 | 2/2018 |

OTHER PUBLICATIONS

Kukolev, P. et al. "Out-of-vehicle time-of-arrival-based localization in ultra-wide band," International Journal of Distributed Sensor Networks, vol. 12(8), pp. 1-11, 2016.
Kukolev, P. "Intra- and Out-Of-Vehicle Channel Measurements and Modeling," BRNO University of Technology, Doctoral Thesis, pp. 1-80, 2016.
Office Action dated Jun. 1, 2021 issued Canadian Patent Application No. 3,077,899.

* cited by examiner

METHOD AND SYSTEM FOR LOCALIZING A MOVABLE OBJECT

BACKGROUND OF THE INVENTION

1. Field of the Invention

The invention relates to a method and a system for localizing a movable object.

2. Description of the Related Art

In many applications, the precise localization of objects, such as vehicles, robots or containers, is required to fulfill tasks from the field such as navigation, industrial processes or logistics.

The high-precision localization can be technically very complex or a system can, for instance, restrict the availability of an adequate power supply or limit radio communication in terms of range, transmission direction or bandwidth, as a result of which a localization can be undesirably restricted.

It may be necessary, for instance, for an ultra-wide band radio communication, that only movable units are permitted to transmit in frequency ranges provided especially for traffic applications, where the frequency ranges have a bandwidth required for a precise localization.

SUMMARY OF THE INVENTION

It is therefore an object of the present invention to provide a method or a device for precise localization of an object, where a stationary unit receives corresponding high-frequency signals and does not emit high-frequency signals, i.e., does not transmit data but, instead, only one mobile unit incorporated in the object to be localized sends high-frequency signals or data.

This and other objects and advantages of localizing a movable object are achieved in accordance with the invention by a method in which the movable object comprises a first transmitter and a second transmitter, where the first and the second transmitter are arranged at a geometric distance relative to one another, and the first transmitter and the second transmitter each transmit a first signal and a second signal, where the first and second signal are in temporal synchrony with one another, and moreover a receiver is provided which, via a receiving device, receives the first signal and determines a first direction from which the first signal is received, and receives the second signal and determines a second direction from which the second signal is received, and determines a runtime difference between the first signal and the second signal, and where the position of the movable object is determined from the runtime difference, the distance, the first direction and the second direction by an evaluator.

This ensures that a method is created easily, which permits high-precision localization and dispenses with operating a transmitter in order to determine the position remote from the object.

In a preferred embodiment, the receiver is arranged remote from the movable object. In other words, there is no physical connection between the receiver and the movable object.

In another embodiment of the invention, the position of the movable object is transmitted from the evaluator to a control device via a communication means. This ensures that a device arranged on the movable object can receive and further process the position of the movable object.

It is also an object of the invention to provide a system for localizing a movable object in which the movable object comprises a first transmitter and a second transmitter arranged at a geometric distance relative to one another, where the first transmitter is configured to transmit a first signal and the second transmitter is configured to transmit a second signal, wherein the first and second signal are in temporal synchrony relative to one another, and further a receiver is provided which is configured to, via a receiving device, (i) receive the first signal and determine a first direction from which the first signal is received, (ii) receive the second signal and to determine a second direction from which the second signal is received and (iii) determine a runtime difference between the first signal and the second signal, and where the receiver incorporates/includes an evaluator that is configured to determine the position of the movable object from the runtime difference, the distance, the first direction and the second direction.

In an embodiment of the invention, the movable object is a vehicle, particularly preferably a bus, and the movable object is located on a traffic route, for instance.

By applying the method with a movable vehicle that has a corresponding transmit device, a position determination of the vehicle relative to the receiver is permitted. As a result, the position of a vehicle, such as a passenger car, truck or bus on a traffic route or a traffic area, such as a street or a crossing, can be easily determined with very high precision, such as in the cm range.

It is advantageous if the vehicle-side transmit apparatus has a small design, a simple system architecture and is cost-effective, such as is permitted by simple transmit devices without complex signal processing.

In another embodiment of the invention, the receiver is arranged in stationary manner, preferably on or in a traffic route.

Moreover, it is advantageous if the street-side receiving apparatus has a signal evaluation device, because compared with vehicle-side devices there are frequently fewer requirements on the street side with respect to installation size, current consumption, system complexity or costs.

The phrase "on or in a traffic route" means that a geometric proximity between the two transmitters and the receiver is achieved in order to configure the range of the system favorably and to be able to receive and evaluate receive signals with an adequate quality. The transmit power is frequently regulated by radio regulations.

This ensures that the receiver can be attached at a position, for instance on a traffic sign, traffic lights or another apparatus on or adjacent to a street. The position of the receiver can be determined using conventional geodetic methods, as a result of which an absolute position determination of the vehicle can take place.

In a further embodiment of the invention, the first and second receivers each comprise ultra-wideband (UWB) transmitters, which preferably operate in a frequency range at 4 GHz or at 6.5 GHz and particularly preferably with a bandwidth of 500 MHz. This means that a large bandwidth can advantageously be used for high-precision position determination.

In yet another embodiment of the invention, a control device and a communication device are also included, where the communication device is configured to establish a communication channel between the evaluator and the control device and the system is configured to transfer the position of the movable object from the evaluator to the control device via the communication channel. This ensures that a control device connected via radio communication can receive and further process the determined position of the movable object or of the vehicle.

In another embodiment of the invention, the movable object includes the control device, which is preferably a driver assistance system, particularly preferably a navigation system. This ensures that the control device is arranged on the vehicle, for instance, as a result of which the determined position information can be further processed on the vehicle.

In a further embodiment of the invention, the communication device comprises a radio communication system that operates in accordance with the Intelligent Transport Systems (ITS-G5) Standard or the Institute of Electrical and Electronics Engineers (IEEE) 802.11p standard. This ensures that a communication channel, which can already be integrated in the vehicle for other applications, is likewise used by the inventive method and a synergy to other systems in a vehicle can thus develop.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with the aid of an exemplary embodiment shown in the appended drawings, in which.

DETAILED DESCRIPTION OF THE EXEMPLARY EMBODIMENTS

It is clear that not all parts of the inventive system or for performing the inventive method are shown, such as electronic control components, power supplies and fastening components. It should be understood these parts are not shown and described merely for purposes of clarity and improved understanding.

Figure 1:
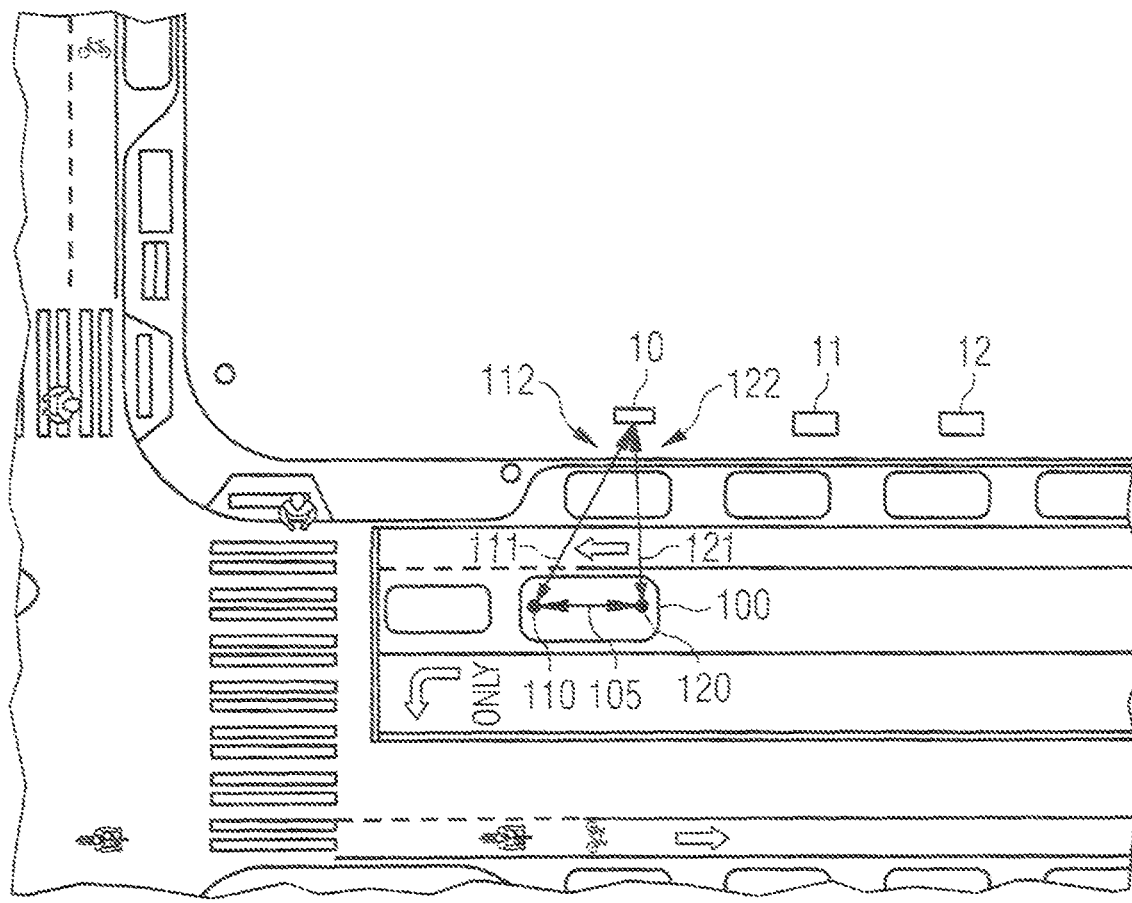
FIG. 1 is an exemplary schematic illustration of a scenario for a localization of a vehicle in accordance with the method in accordance with the invention.

FIG. 1 shows a schematic representation of an exemplary embodiment for a system in accordance with the invention with a scenario for localizing a vehicle 100, such as a bus, which is located on a traffic area, in this example a crossing. The vehicle 100 has a first transmitter 110 and a second transmitter 120 arranged at a geometric distance 105 relative to one another.

The geometric distance 105 between two transmitters 110 and 120 should be as large as possible, for instance 2 to 5 meters, and is generally restricted by the dimensions of the vehicle 100. If the vehicle is a bus, for instance, a greater distance, such as 5 to 15 meters, can thus be realized.

The first transmitter 110 is configured to transmit a first signal 111. The second transmitter 120 is configured to transmit a second signal 121, where the first and second signals 111, 121 are in temporal synchrony relative to one another.

The first and second transmitters 111, 121 are each ultra-wideband (UWB) transmitters, which operate in a frequency range at 4 GHz or at 6.5 GHz and with a bandwidth of 500 MHz, for instance.

A receiver 10, 11, 12 is provided in a stationary position, adjacent to or adjoining the traffic area or traffic route, where the receiver 10, 11, 12 is configured to, via a receiving device 20, (i) receive the first signal 111 and determine a first direction 112 from which the first signal 111 is received, (ii) receive the second signal 121 and (iii) determine a second direction 122 from which the second signal 121 is received.

The receiving angle 112, 122 with respect to the respective transmitter 110, 120 can be determined via a corresponding receiving device, such as an antenna group, an IQ receiver and an evaluation unit, as known in the prior art.

Figure 2:
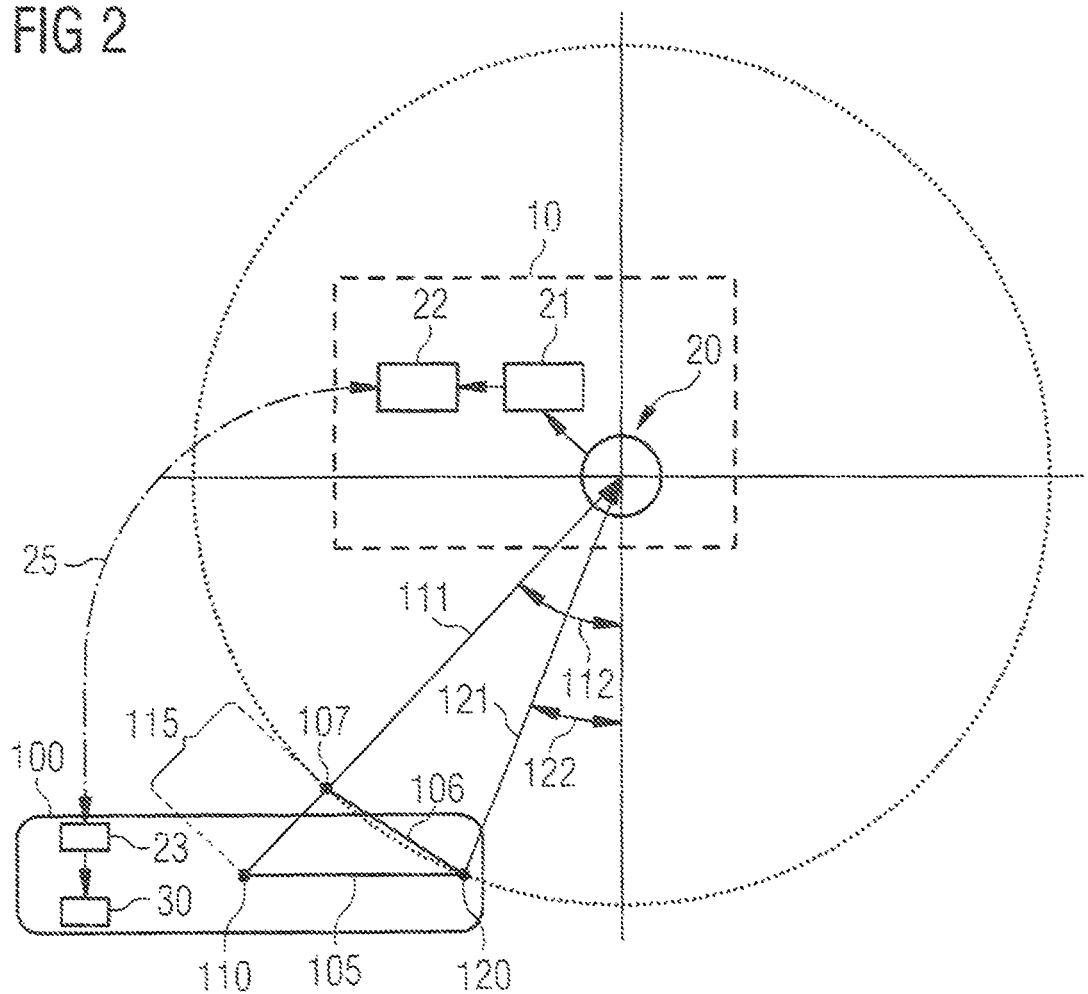
FIG. 2 is a schematic block diagram of the arrangement illustrated in FIG. 1.

FIG. 2 shows the scenario of FIG. 1 in detail. Here, the receiver 10-12 is also configured to determine a runtime difference 115 between the first signal 111 and the second signal 121 by way of the receiving device 20. This can be performed, for instance, by phase measurement between the first and second signals 111 and 121.

The receiver 10, 11, 12 also has an evaluator 21, which is configured to determine the position of the movable object 100 from the runtime difference 115, the distance 105, the first direction 112 and the second direction 122.

In order to improve the signal quality of the first and second signals 111 and 121, a Kalman filter can be used, for instance, as a result of which errors in real measured values can be reduced or estimations for non-measurable system variables can be supplied.

Figure 3:
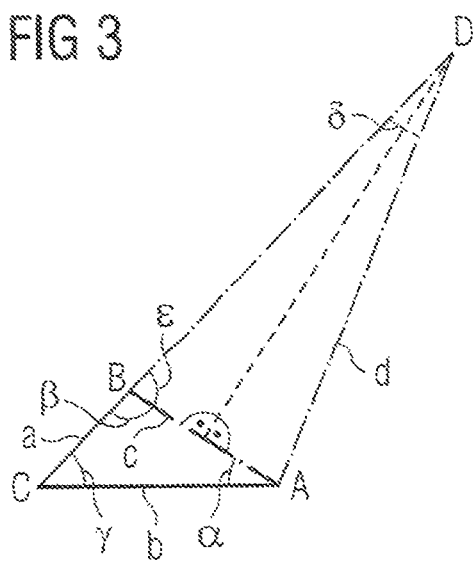
FIG. 3 a simplified representation of the schematic block diagram of FIG. 2.
Figure 4:
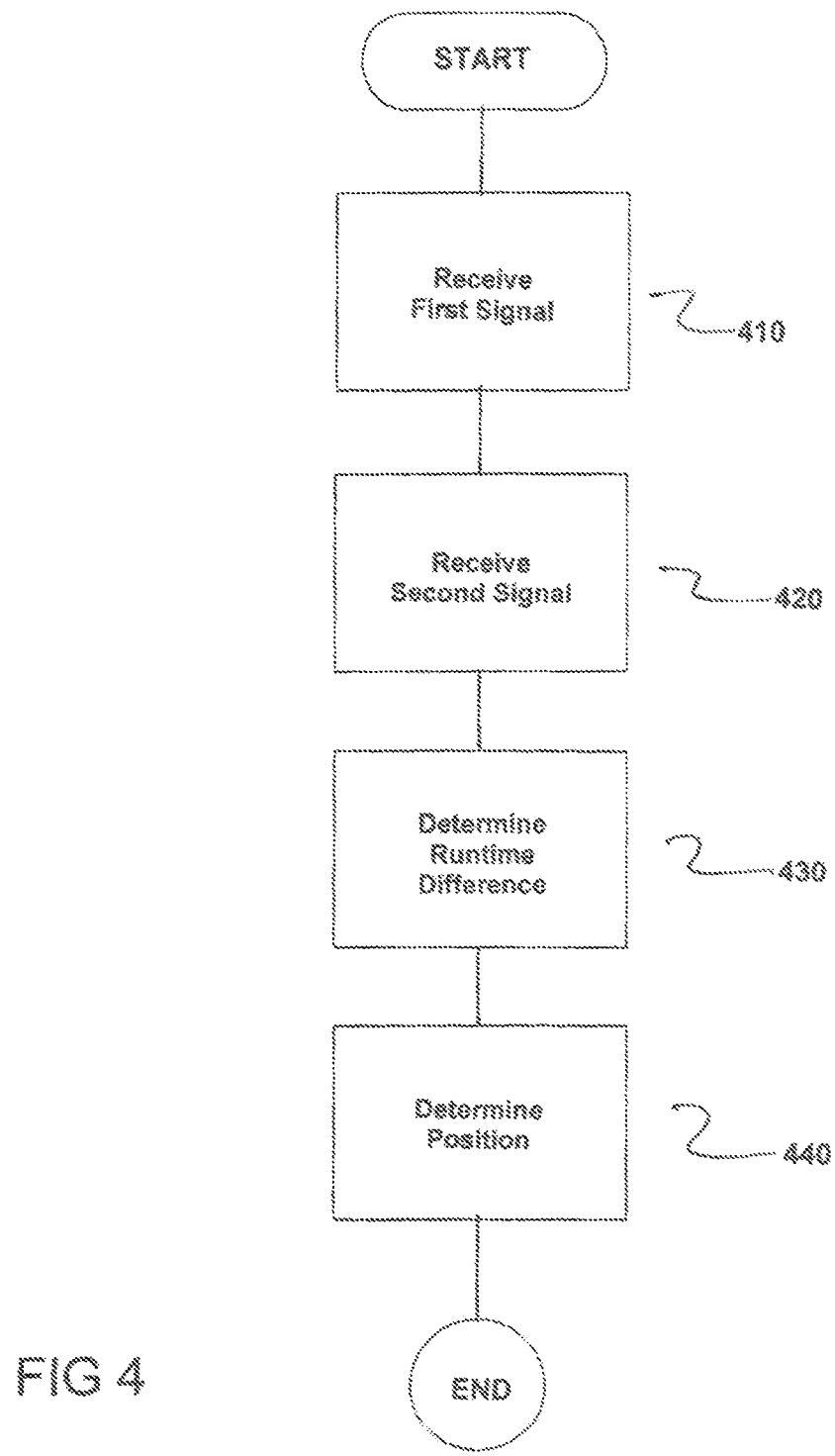
FIG. 4 is a flowchart of the method in accordance with the invention.

FIG. 3 shows a representation of triangles, which represent the scenario in FIG. 2 in a simplified manner.

A first triangle is formed by points A, B, and C.

Point A corresponds to the position of the second transmitter 120.

Point B corresponds to the position 107 according to FIG. 2.

Point C corresponds to the position of the first transmitter 110.

Furthermore, for simplified representation an edge also means its edge length. An edge a connects points B and C, where the edge length of the edge a can be calculated from the runtime difference 115 as an equivalent geometric distance:

$$s \approx c \cdot t$$

The route s can therefore be determined approximately from the light speed c and the measured time t. In other words, the runtime difference 115 can be determined by the temporal offset between the first signal 111 and the second signal 121 by means of the receiving device 20.

In the first triangle, an angle $\alpha$ opposes the edge a.

An edge b connects points A and C and corresponds to the distance 105 between the first transmitter 110 and the second transmitter 120.

In the first triangle, an angle $\beta$ opposes the edge b.

An edge c connects the points A and B.

In the first triangle, an angle $\gamma$ opposes the edge c.

A second isosceles triangle is formed by the points A, B and D, where the points A and B, and the edge c are identical to the first triangle.

Point D corresponds to the position of the receiving device 20, in other words, for instance, a receiving antenna of the receiving device 20.

Two limbs d of the second triangle which are the same length each cover an angle δ, where the angle δ is formed by the angle difference between the first receiving angle 112 relative to the transmitter and the second receiving angle 122 relative to the transmitter. A reference coordinate system for the receiving angle measurement is compensated by the determination of the angle difference.

The angle δ opposes the edge c.

The second triangle can be easily divided into two symmetrical third triangles, which enclose a first angle with δ/2, a second angle ε and a third, right angle.

According to the interior angle set of a triangle $$\delta/2 + \varepsilon + 90° = 180°$$

and the association between the first and the second triangle, $$\beta + \varepsilon = 180°$$

the angle β can be determined:

$$\beta = \delta/2 + 90°$$

The angle α can be determined from the sine set $$\frac{a}{\sin(\alpha)} = \frac{b}{\sin(\beta)}$$

The angle γ can therefore be determined.

$$\gamma = 180° - \alpha - \beta$$

The edge length c can now be determined via the cosine set.

$$c^2 = a^2 + b^2 + \cos(\gamma)$$

Moreover, the sought distance d can be determined via the association $$\cos(\delta/2) = \frac{c/2}{d}$$

and thus the position of the vehicle 100.

In a further embodiment, the system comprises a control device 30 and a communication device 22, where the communication device 22 is configured to establish a communication channel 25 between the evaluator 21 and the control device 30, and the system is configured to transfer the position of the movable object 100 from the evaluator 21 via the communication channel 25 to the control device 30.

The control device 30 can be incorporated in the vehicle 100 and can be a driver assistance system or a navigation system, for instance.

The communication device 22 can be a radio communication system in accordance with the Intelligent Transport Systems (ITS-G5) Standard or the Institute of Electrical and Electronics Engineers (IEEE) 802.11p standard.

FIG. 3 is a flowchart of a method for localizing a movable object 100 comprising a first transmitter 110 and a second transmitter 120 arranged at a geometric distance 105 relative to one another, where the first transmitter 110 and the second transmitter 120 each transmit a first signal 111 and a second signal 121, and where the first and second signal 111, 121 are in temporal synchrony relative to one another. The method comprises receiving, by a receiving device 20 within a receiver 10, 11, 12, the first signal 111 and determining a first direction 112 from which the first signal 111 is received, as indicated in step 310.

Next, the second signal 121 is received by the receiving device 20 within the receiver 10, 11, 12 and a second direction 122 from which the second signal 121 is received is determined, as indicated in step 320.

Next, a runtime difference 115 between the first signal 111 and the second signal 121 is determined by an evaluator 21 within the receiver 10, 11, 12, as indicated in step 330.

Next, the position of the movable object 100 is determined from the runtime difference 115, the geometric distance 105, the first direction 112 and the second direction 122 by the evaluator 21 within the receiver 10, 11, 12, as indicated in step 340.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for localizing a movable object comprising a first transmitter and a second transmitter arranged at a geometric distance relative to one another within the movable object, the first transmitter and the second transmitter each transmitting a first signal and a second signal from the movable object, the first and second signal being in temporal synchrony relative to one another, the method comprising:
   receiving, by a receiving device within a receiver, the first signal transmitted from the movable object and determining a first direction from which the first signal is received;
   receiving, by the receiving device within the receiver, the second signal transmitted from the movable object and determining a second direction from which the second signal is received;
   determining, by an evaluator within the receiver, a runtime difference between the first signal and the second signal; and
   determining, by the evaluator within the receiver, a position of the movable object, from the runtime difference, the geometric distance, the first direction and the second direction.

2. The method as claimed in the claim 1, further comprising:
   transferring the position of the movable object from the evaluator to a control device via a communication device.

3. A system for localizing a movable object comprising a first transmitter and a second transmitter arranged at a geometric distance relative to one another within the movable object, the first transmitter being configured to transmit a first signal and the second transmitter is configured to transmit a second signal, wherein the first and second signal are in temporal synchrony relative to one another, the system comprising:
    a receiver comprising:
        a receiving device; and
        an evaluator;
    where the receiver is configured to, via the receiving device, (i) receive the first signal transmitted from the movable object and determine a first direction from which the first signal is received, (ii) receive the second signal transmitted from the movable object and determine a second direction from which the second signal is received and (iii) determine a runtime difference between the first signal and the second signal; wherein the receiver is configured to, via the evaluator, determine a position of the movable object from the runtime difference, the geometric distance, the first direction and the second direction.

4. The system as claimed in claim 3, wherein the movable object is a vehicle.

5. The system as claimed in claim 3, wherein the vehicle is a bus.

6. The system as claimed in claim 3, wherein the receiver is arranged in a stationary manner.

7. The system as claimed in claim 4, wherein the receiver is arranged in a stationary manner.

8. The system as claimed in claim 6, wherein the receiver is arranged in a stationary manner on a traffic route.

9. The system as claimed in claim 7, wherein the receiver is arranged in a stationary manner on a traffic route.

10. The system as claimed in claim 3, wherein the first and second transmitters each comprise a ultra-wideband (UWB) transmitter, which operate in a frequency range at 4 GHz or at 6.5 GHz and with a bandwidth of 500 MHz.

11. The system as claimed in claim 3, further comprising:
    a control device; and
    a communication device configured to establish a communication channel between the evaluator and the control device;
    wherein the system is configured to transmit the position of the movable object from the evaluator via the communication channel to the control device.

12. The system as claimed in claim 11, wherein the movable object includes the control device.

13. The system as claimed in claim 12, wherein the control device comprises a driver assistance system.

14. The system as claimed in claim 13, wherein the driver assistance system comprises a navigation system.

15. The system as claimed in claim 11, wherein the communication means is a radio communication system in accordance with Intelligent Transport Systems (ITS-G5) Standard or Institute of Electrical and Electronics Engineers (IEEE) 802.11p standard.

16. The system as claimed in claim 12, wherein the communication means is a radio communication system in accordance with Intelligent Transport Systems (ITS-G5) Standard or Institute of Electrical and Electronics Engineers (IEEE) 802.11p standard.

\* \* \* \* \*